United States Patent [19]

Magyar

[11] 4,451,511
[45] May 29, 1984

[54] SYSTEM FOR PROTECTING GLASS STRUCTURES IN A COMBUSTION ZONE

[75] Inventor: John C. Magyar, Hamilton, Miss.

[73] Assignee: Kerr-McGee Chemical Corporation, Oklahoma City, Okla.

[21] Appl. No.: 403,560

[22] Filed: Jul. 30, 1982

[51] Int. Cl.$^3$ .......................... B05D 1/00; B32B 1/08
[52] U.S. Cl. ...................................... 428/35; 427/160; 428/426; 428/429
[58] Field of Search ................ 427/160; 428/426, 429, 428/35

[56] References Cited

U.S. PATENT DOCUMENTS 4,216,259  8/1980  Groth .............................. 427/160 X Primary Examiner—James R. Hoffman
Attorney, Agent, or Firm—William G. Addison

[57] ABSTRACT

A system for protecting glass structures in a combustion zone wherein heat refractory material is applied to the glass structure. The applied heat refractory material substantially is opaque and non-reflective to visible light and also is resistant to degradation at temperatures of up to about 2500 degrees farenheit. The heat refractory material acting to absorb radiant energy and to inhibit the devitrification of glass structures maintained at temperatures elevated to about 1000 degrees centigrade for extended periods of time.

17 Claims, 2 Drawing Figures

SYSTEM FOR PROTECTING GLASS STRUCTURES IN A COMBUSTION ZONE

BACKGROUND OF THE INVENTION

Field of the Invention

The present invention generally relates to a system for protecting fused silica glass structures in a combustion zone and, more particularly, but not by way of limitation, to a system for protecting glass structures in a combustion zone wherein a refractory material is applied to the glass structure.

DESCRIPTION OF THE PREFERRED EMBODIMENT

Figure 1:
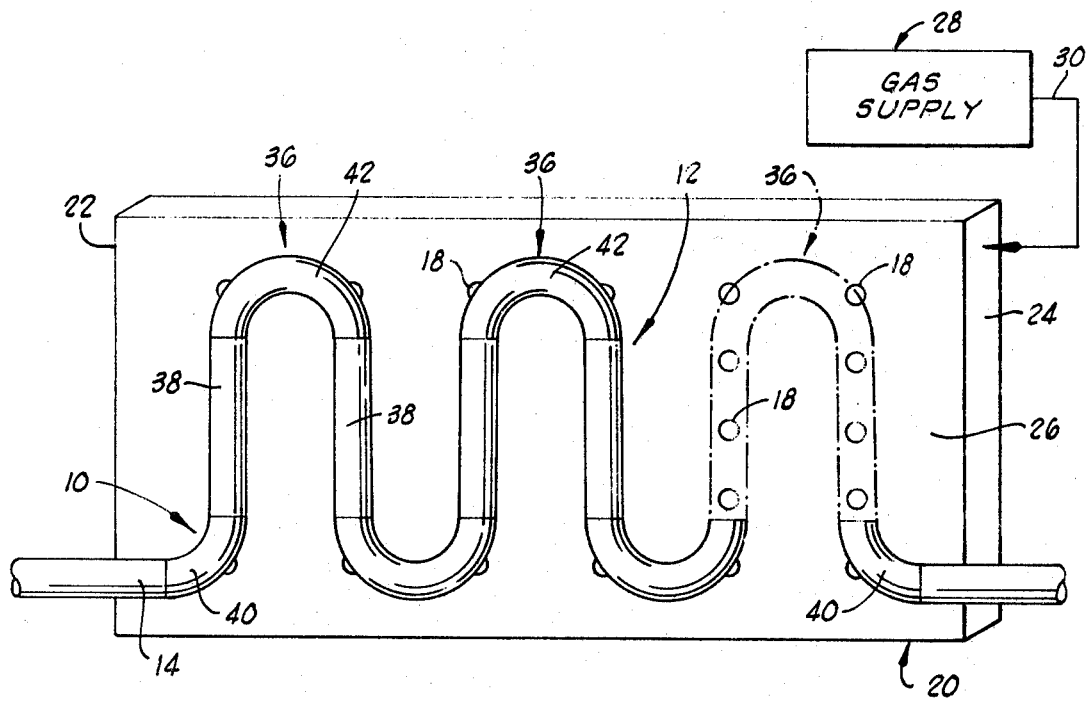
FIG. 1 is a diagrammatic view showing a tubular glass structure in a combustion zone protected in accordance with the present invention.
Figure 2:
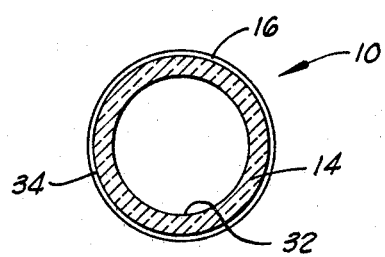
FIG. 2 is a cross sectional view of the tubular glass structure of FIG. 1.

Shown in FIGS. 1 and 2 is an apparatus 10 which is adapted for use in a combustion zone 12. The apparatus 10 generally comprises a glass structure 14 which is disposed in the combustion zone 12 and a layer of refractory material 16 which is applied to the portion of the glass structure 14 to be protected for protecting the glass structure 14 in accordance with the system of the present invention.

A plurality of spaced apart burner jets 18 are supported in a support structure 20, as shown in FIG. 1 (only some of the burner jets 18 are designated with a reference numeral and only some of the burner jets 18 are shown in FIG. 1). The support structure 20 has opposite ends 22 and 24 and a wall 26, and each of the burner jets 18 is positioned to direct a flame a distance in a direction generally away from the wall 26 during the operation. A gas supply 28 is connected by way of a conduit 30 to each of the burner jets 18, the conduit 30 being shown in FIG. 1 entering the end 24 of the support structure 20 and the connection between the conduit 30 and each of the burner jets 18 not being shown in FIG. 1. In operation, the gas supply 28 functions to provide fuel, such as gas, to each of the burner jets 18 and each of the burner jets 18 is adapted to project a flame a distance from the wall 24. The area of generally maximum heat intensity heated by the flames from the burner jets 18 comprises the combustion zone 12. The construction and operation of apparatus, such as burners, adapted to provide combustion zones, such as the combustion zone 12, are well known in the art, and a further detailed description of the construction and operation of the various components utilized for creating the combustion zone 12 is not deemed necessary.

The glass structure 14, more particularly, is a tubular shaped, fused silica glass structure and includes an opening 32 which extends axially through the glass structure 14. As shown more clearly in FIG. 2, the glass structure 14 has a circular shaped cross section; however, the glass structure can have any cross sectional shape which might be desired in a particular application. Thus, the term "tubular" as used herein is not to be construed as limiting the glass structure to any particular cross sectional shape.

The glass structure 14 has an outside surface 34 and the heat refractory material 16, more particularly, is applied to the outside surface 34 of the portion of the glass structure 14 which is disposed in the combustion zone. In combustion zones where the temperature is relatively high, such as above one thousand degrees centigrade, for example, glass structures or portions thereof devitrify in relatively short periods of time. The heat refractory material 16 on the glass structure 14 substantially reduces devitrification of the glass structure 14 induced at relatively high temperatures.

As shown in FIG. 1, the glass structure 14 includes a plurality of generally U-shaped sections 36 disposed generally between the opposite ends 22 and 24 of the support structure 20. Three U-shaped sections 36 are shown in FIG. 1 and one of the U-shaped sections 36 is shown in FIG. 1 in dashed lines so that some of the burner jets 18 may be shown more clearly. In a particular application, a glass structure may include more U-shaped sections.

To construct the U-shaped sections 36, the glass structure 14 comprises a plurality of relatively straight connectors 38 (only two of the straight connectors 38 being designated with a reference numeral in FIG. 1), two right angle connectors 40, and a plurality of U-shaped connectors 42 (only two of the U-shaped connectors 42 being designated with a reference numeral in FIG. 1). One end of a straight connector 38 is glass welded to each end of one of the U-shaped connectors 42. Near the end 22 of the support structure 20, a right angle connector 40 is glass welded to two straight connectors 38 and, near the end 24 of the support structure 20, the other right angle connector 40 is glass welded to two straight connectors 38, the right angle connectors 40 being utilized to provide the connection for entering the combustion zone 12.

The burner jets 18 are spaced on the support structure 20 so that each burner jet 18 projects a flame in close proximity to a portion of the glass structure 14. The U-shaped sections 36 are adapted and shaped so that the glass structure 14 generally follows a path between the opposite ends of the support structure 20 which disposes portions of the glass structure 14 in close proximity to each of the burner jets 18.

The present invention particularly is adapted to be utilized in a process for producing titanium dioxide. In this process, a stream of gaseous titanium tetrachloride is heated to about one thousand degrees centigrade. The heated titanium tetrachloride is oxidized with oxygen. The heated stream of titanium tetrachloride is highly corrosive, particularly at such elevated temperature levels and, thus, such streams of titanium tetrachloride must be passed through relatively corrosion-resistant, chemically inert materials during the heating process. In the process for producing titanium dioxide, the gaseous titanium tetrachloride is passed through the opening 32 in the glass structure 14 and the gaseous titanium tetrachloride is heated to a relatively high temperature (about one thousand degrees centigrade) in the combustion zone 14.

The glass structure 14, utilized in the process for producing titanium dioxide, is available under the name "fused silica", manufactured by Thermal American Fused Quartz, or under the trade name "Rotosil", manufactured by Heraeus Amersil, for example. This particular type of glass structure is suitable for use in combustion zones having relatively high temperatures and has a melting point which is above fifteen hundred degrees centigrade, for example, the glass structure is vitreous and non-crystalline.

The process for producing titanium dioxide and the utilization of glass structures in a combustion zone for heating the titanium tetrachloride are well known in the art. In this process, the glass structure devitrifies when subjected to heating at about one thousand degrees centigrade. This devitrification of the glass structure is characterized by cracks developing from the heated glass structure surface and penetrating through the glass structure. The eventual outcome of this devitrification is failure of the glass structure to retain the gaseous titanium tetrachloride which necessitates the rebuilding of the glass structure or the failed portions thereof. The layer of heat refractory material 16 on substantially all of the outside surface 34 of the glass structure 14 substantially reduces devitrification of the glass structure 14 induced at relatively high temperatures.

The heat refractory material 16 comprises a silicone resin and, preferrably, is opaque to visible light. One particular heat refractory material which is suitable for use in the system of the present invention is a black paint type of heat refractory material available under the trade designation, Pyromark 1500, from Tempil division of Big Three Industries, Inc. of South Plainfield, N.J. The layer of heat refractory material 16 is painted on the outside surface 34 of the glass structure 14 and the layer is from about 0.015 inches to about 0.025 inches thick. The heat refractory material substantially is resistant to chipping, blistering, cracking and peeling at temperatures of up to about twenty-five hundred degrees farenheit (1371.1 degrees centigrade). Further, the heat refractory material is non-light reflective for absorbing radiant energy in a more efficient manner.

In one experiment, a glass structure without the layer of heat refractory material and a glass structure with the layer of heat refractory material were placed in a combustion zone having a temperature of about one thousand degrees centigrade. After about two months of intermittent operation, the two glass structures were removed from the combustion zone. The glass structure without the layer of heat refractory material was devitrified and contained developing cracks. The glass structure with the layer of heat refractory material was lightly devitrified and had not developed cracks.

Changes may be made in the parts or elements of the apparatus or in the steps or the sequence of steps of the method disclosed herein without departing from the spirit and scope of the invention as devined in the following claims.

I claim:

1. A process for substantially protecting from devitrification a glass structure having an outside surface disposed within a combustion zone comprising the steps of:
providing a source of heat refractory material substantially opaque and non-reflective to visible light and substantially resistant to chipping, blistering, cracking and peeling at temperatures of up to about 2500 degrees farenheit; and
applying the heat refractory material to the outside surface of the glass structure to be protected substantially to reduce devitrification of the glass structure at relatively high temperatures.

2. The process of claim 1 wherein the glass structure is further defined as being tubular.

3. The process of claim 1 wherein the glass structure includes at least one portion of the glass structure welded to another portion of the glass structure.

4. The process of claim 1 wherein the glass structure is defined further as being vitreous and non-crystalline and as having a melting point above fifteen hundred degrees centigrade.

5. The process of claim 1 wherein the step of applying the heat refractory material is defined further as applying the heat refractory material to a thickness in a range from about 0.015 inches to 0.025 inches.

6. The process of claim 1 wherein the refractory material comprises a silicone resin.

7. The process of claim 1 wherein the heat refractory material is defined further as being essentially black.

8. An apparatus adapted for use in a combustion zone comprising:
a glass structure having an outside surface disposable in the combustion zone; and
a layer of heat refractory material substantially opaque and non-light reflective light applied to the outside surface of the glass structure for protecting the glass structure from devitrification induced at relatively high temperatures.

9. The apparatus of claim 8 wherein the glass structure is further defined as being tubular.

10. The apparatus of claim 9 wherein the layer of the heat refractory material is defined further as being applied to substantially all of the outside surface of the glass structure.

11. The apparatus of claim 8 wherein the glass structure includes at least one portion of the glass structure welded to another portion of the glass structure.

12. The apparatus of claim 8 wherein the glass structure is defined further as having a melting point above about fifteen hundred degrees centigrade.

13. The apparatus of claim 8 wherein the heat refractory material is defined further as being substantially resistant to chipping, blistering, cracking and peeling at temperatures of up to about twenty-five hundred degrees farenheit.

14. The apparatus of claim 8 wherein the step of applying the heat refractory material is defined further as applying the heat refractory material to a thickness in a range from about 0.015 inches to 0.025 inches.

15. The apparatus of claim 8 wherein the refractory material comprises a silicone resin.

16. The apparatus of claim 8 wherein the heat refractory material is defined further as efficiently absorbing radiant energy.

17. The apparatus of claim 8 wherein the heat refractory material is defined further as being essentially black.

* * * * *